(No Model.) 2 Sheets—Sheet 1.

H. HEGNER & J. M. SKINNER.
WATER FILTER.

No. 437,433. Patented Sept. 30, 1890.

WITNESSES
Carroll J. Webster.
Anna J. Lehaney.

INVENTOR
Henry Hegner
John M. Skinner
By William Webster
Atty (No Model.) 2 Sheets—Sheet 2.

H. HEGNER & J. M. SKINNER.
WATER FILTER.

No. 437,433. Patented Sept. 30, 1890.

WITNESSES
Carroll J. Webster.
Anna J. Dehaney

INVENTOR
Henry Hegner
John M. Skinner
By William Webster
Att'y

United States Patent Office.

HENRY HEGNER AND JOHN M. SKINNER, OF TOLEDO, OHIO.

WATER-FILTER.

SPECIFICATION forming part of Letters Patent No. 437,433, dated September 30, 1890.

Application filed August 5, 1889. Serial No. 319,775. (No model.)

*To all whom it may concern:*

Be it known that we, HENRY HEGNER and JOHN M. SKINNER, citizens of the United States, residing in Toledo, in the county of Lucas and State of Ohio, have invented certain new and useful Improvements in Water-Filters; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to water-filters of that character in which the filtration is accomplished by causing the unfiltered water to percolate through the porous walls or sides of a vessel, whereby the impurities are effectually removed therefrom.

The object of our invention is to construct a filter wherein the water may be introduced under pressure, thereby facilitating the operation of filtration.

A further object is to provide means by which the deposit left by the water in the process of filtration may be conveniently removed from the wall or sides of the filtering medium and from the filter without necessitating the removal of any of the parts.

A further object is to provide a filter in which the water may be introduced directly from the main, and from which either filtered water for culinary or other like purposes or unfiltered water for scrubbing, &c., can be drawn at will.

The invention consists in the parts and combination of parts hereinafter described, and pointed out in the claims.

Figure 1:
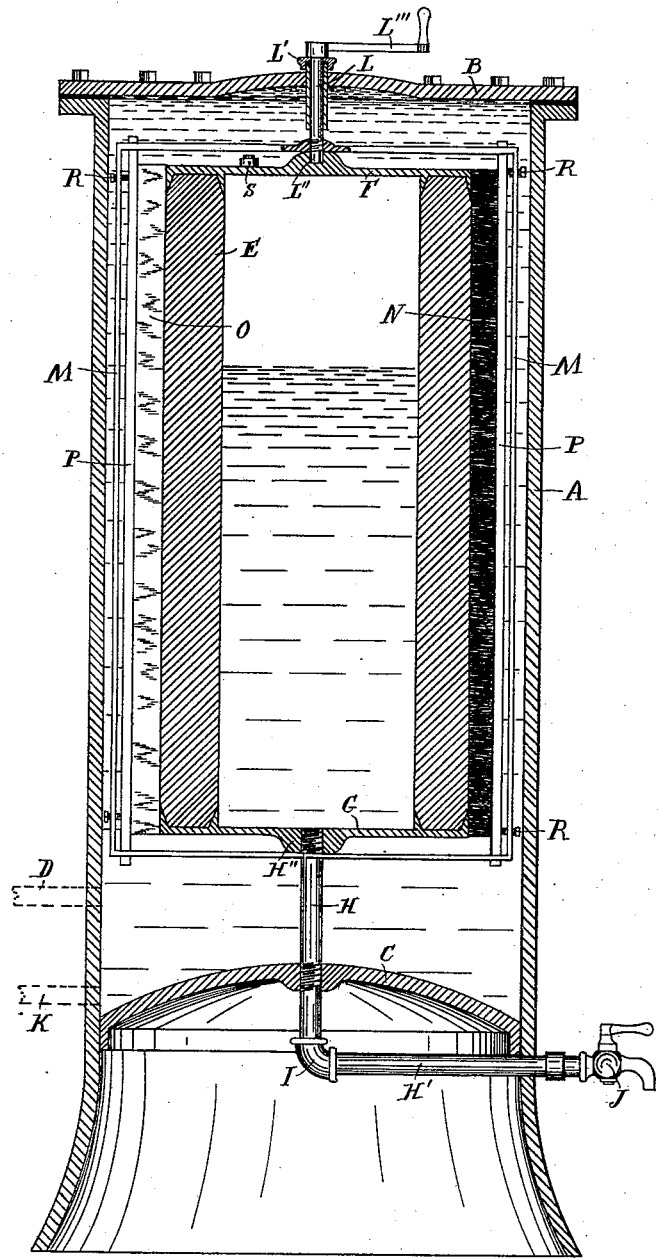
Figure 2:
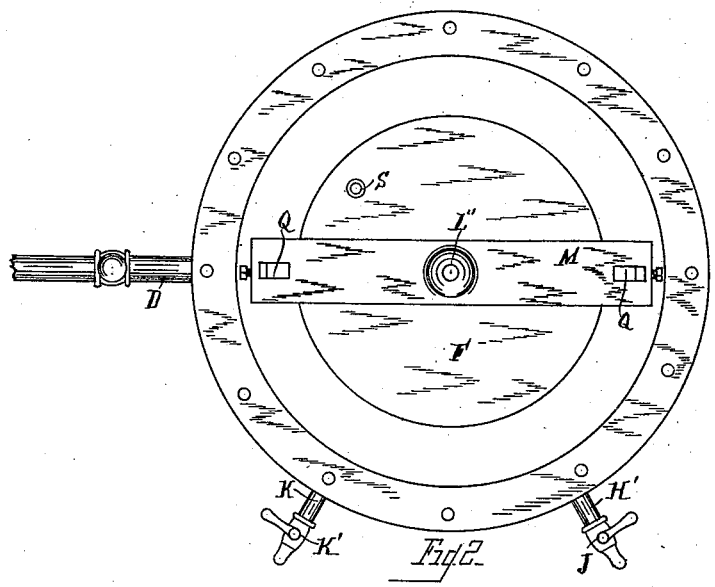
Figure 3:
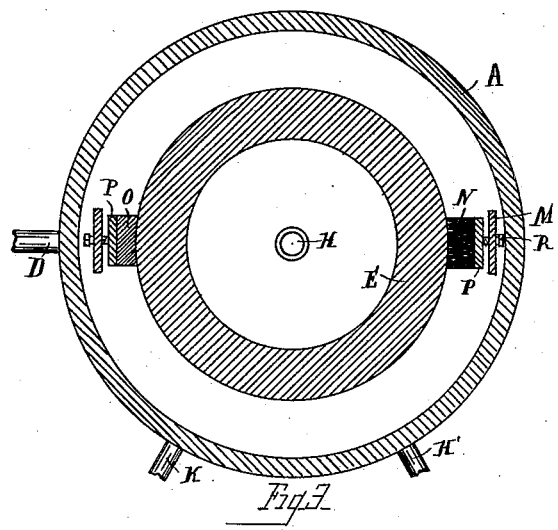

In the drawings, Figure 1 is a longitudinal sectional view of a filter constructed in accordance with our invention. Fig. 2 is a top plan view with the top of the filter removed to disclose the inner cylinder and the arrangement of the revoluble cleaning apparatus journaled within the filter. Fig. 3 is a transverse section through the filter, showing the position of the brush and scraper with relation to the inner cylinder.

A designates the outer shell of the filter, which is made water-tight by means of a head B and base C, properly secured to the shell, the whole being of a strength to withstand the pressure of the water in the main, which is introduced into the shell by means of a pipe D, leading from the service-pipe to the interior of the same.

E designates a filtering-cylinder composed of any preferred plastic or other material having a porosity sufficient to allow the water to be forced therethrough either with or without pressure. Cylinder E is closed at each end by means of an upper head F and a lower head G, respectively, preferably formed of metal properly coated with some anti-corrosive material.

H designates a pipe tapped through the base of the shell and screwed through the lower head of the filtering-cylinder, there being a pipe H' connected at right angles thereto by means of a coupling I, said pipe extending through the outer shell and being provided with a cock J, by which means the filtered water may be withdrawn from the filtering-cylinder.

K designates a pipe tapped through the shell and provided with a cock K', by which the water may be withdrawn from the shell.

The filtering-cylinder is sustained in proper height and position within the shell by means of the pipe H at the lower end thereof and by means of a shaft L, passed through a stuffing-box L', secured in a perforation centrally of the head B, the shaft being journaled in a perforation formed in a boss L'' in the head.

M designates a rectangular frame journaled upon pipe H and secured upon shaft L, by which means the frame may be revolved concentrically of the cylinder E by means of a crank L''', secured upon shaft L. The base L'' and a boss H'' upon the lower side of the lower head G, and through which pipe H is tapped, serve as bearings for the upper and lower cross-bars, respectively, of frame M and allow the frame to turn freely thereon. Frame M is of a width to allow of an interposed brush N between the side thereof and the frame and a rubber scraper O upon the opposite side of the frame, the brush and rubber being secured to vertical bars P, held adjustably in the upper and lower cross-bars of the frame by being passed through openings Q in the same and moved laterally to any desired adjustment by means of set-screws R, tapped through the side of the frame.

S designates a relief-valve placed in the upper head of the filtering-cylinder for a purpose hereinafter stated.

In operation water is admitted to the shell through pipe D, and percolates through the filtering-cylinder, depositing the extraneous matter upon the outer side of the cylinder, thereby requiring frequent cleaning of the same—an operation heretofore involving time and labor in removing the parts and gaining access to the interior of the outer shell.

In the present construction to clean the filtering medium of all sediment and to withdraw the same from the shell it is only necessary to revolve the frame, when the brush and rubber will quickly remove all matter upon the cylinder, when, by turning cock K', (the water being first cut off from flowing into the shell,) all of the water may be withdrawn from the shell, leaving the cylinder and shell thoroughly cleansed.

In the process of withdrawing the water from the shell, and thereby removing the support concentrically of the cylinder, or in case a demand is made upon the service-pipe, as in case of fire, thereby withdrawing the pressure, we have found that the pressure of the compressed air within the filtering-cylinder will fracture the same unless allowed to escape. For this purpose we arrange the relief-valve S in the upper head of the cylinder, which opens upwardly by means of the atmospheric pressure and relieves the cylinder.

In some forms of filters the unfiltered water is admitted to the interior of the filtering-cylinder and percolates outwardly. In such constructions we journal the frame upon the inside of the cylinders.

It will be apparent that we may employ brushes upon each side of the frame, or we may employ rubber or any substance suitable for the purpose of frictionally removing the sedimentary deposit without the brushes without departing from the spirit of our invention; or, if desired, we may encircle the cylinder by a horizontal ring or band provided with a means for cleaning the cylinder by reciprocating the same vertically, the spirit of our invention being the removal by mechanical means of any sedimentary deposit upon the cylinder while the cylinder remains intact, this construction being especially adaptable to a rectangular form of filtering-chamber.

What we claim is—

1. In a filter, the combination, with an outer water-tight shell closed at the top, of an ingress-pipe for unfiltered water leading into said shell, a filtering-chamber located within the outer shell independent of the same and also closed at the top, an egress-pipe secured in the filtering-chamber, adapted to carry off the filtered water and support the filtering-chamber, a frame pivotally connected with the exterior of said chamber, adapted to be revolved around the same, and cleaning devices secured to said frame to cleanse the exterior surface of the filtering-chamber, substantially as shown and described.

2. In a filter, the combination, with a shell, of a filtering-chamber located therein and a movable frame provided with cleaning devices adapted to cleanse the exterior surface of the filtering-chamber and adapted to be laterally adjusted within the frame, as and for the purpose set forth.

3. In a filter, the combination, with a shell closed at the top, of a filtering-chamber located therein and also closed at the top, said pipe having a boss formed thereon, an egress-pipe connected with the filtering-chamber and supporting the same, a shaft passing through the top of the shell and secured in the boss on the top of filter-chamber, a rectangular frame surrounding the filtering-chamber and journaled on the said shaft and egress-pipe, and cleaning devices carried by said frame, arranged to contact with the exterior surface of the filtering-chamber, and adapted to be adjusted laterally to and from the same, as and for the purpose set forth.

4. In a filter, an outer shell closed at the top and bottom, an ingress-pipe for water connected therewith and with a supply of water under pressure, and a pipe connected with the shell for withdrawing water therefrom, in combination with a filtering-chamber within the shell, provided with a relief-valve, and an egress-pipe connected with and supporting said filtering-chamber, as and for the purpose set forth.

In testimony that we claim the foregoing as our own we hereby affix our signatures in presence of two witnesses.

HENRY HEGNER.
JOHN M. SKINNER.

Witnesses:
WILLIAM WEBSTER,
CARROLL J. WEBSTER.